United States Patent [19]
Frische

[11] Patent Number: 5,282,711
[45] Date of Patent: Feb. 1, 1994

[54] ASSISTIVE DINING DEVICE, SYSTEM AND METHOD

[75] Inventor: Eric A. Frische, Arlington, Tex.

[73] Assignee: Association for Retarded Citizens of the U.S., Arlington, Tex.

[21] Appl. No.: 778,009

[22] Filed: Oct. 17, 1991

[51] Int. Cl.$^5$ ............................................. A47G 21/00
[52] U.S. Cl. ...................................... 414/9; 414/744.4
[58] Field of Search ......................... 901/17, 18, 49, 2; 206/557, 561, 563; 414/9, 744.4, 749; 215/DIG. 5

[56] References Cited

U.S. PATENT DOCUMENTS

| | | | |
|---|---|---|---|
| 1,933,275 | 10/1933 | Melucci | 414/9 |
| 3,734,306 | 5/1973 | Morewood . | |
| 3,841,499 | 10/1974 | Bullard | 901/18 |
| 3,885,681 | 5/1975 | Mancino . | |
| 3,888,362 | 6/1975 | Fletcher et al. | 901/17 |
| 4,084,695 | 4/1978 | Halbich | 206/561 |
| 4,162,868 | 7/1979 | Stapleton et al. | 414/9 |
| 4,218,167 | 8/1980 | Mansfield | 414/9 |
| 4,364,699 | 12/1982 | Koppes | 414/9 |
| 4,398,857 | 8/1983 | Layman, Sr. | 414/9 |
| 4,433,950 | 2/1984 | Hanger et al. | 414/9 |
| 4,522,543 | 6/1985 | Robinson | 414/9 |
| 4,624,613 | 11/1986 | Taniguchi et al. | 414/9 |
| 4,663,726 | 5/1987 | Chand et al. | 901/2 |
| 5,008,832 | 4/1991 | Torii et al. | 901/2 |

FOREIGN PATENT DOCUMENTS

799508  8/1958  United Kingdom ......... 215/DIG. 5

Primary Examiner—H. Grant Skaggs
Attorney, Agent, or Firm—John W. Montgomery

[57] ABSTRACT

An assistive dining device for automatic switch-operated self-feeding has a concave food receptacle having a predetermined depth below an upwardly projecting lip. A rod having an end rotatable about an axis and linearly moveable along the axis is positioned, substantially parallel to and above the upward projecting food receptacle lip. A feeding utensil having a food collection face, is affixed to the end of the rod for rotation and linear movement therewith, which utensil is angularly disposed from the axis of the rod such that food collection face is substantially horizontal downward in a first rotary position and substantially horizontal upward in a second rotary position rotated approximately one-half of a revolution about the axis of the rod, so that the radius of the arc defined by the distal end of the utensil during rotation corresponds to the predetermined depth of the receptacle. A motor is operatively associated with the rod and utensil for rotating the utensil from the first rotary position to the second to collect food from the receptacle onto the utensil and also for rotating the utensil from the second rotary position to the first position. A motor is also operatively associated with the rod for linearly moving the rod and utensil when in its second rotary position from a retracted linear position to an outward position past the lip of the receptacle for presenting the food on the utensil for consumption by the user and for returning the utensil to the retracted position.

5 Claims, 10 Drawing Sheets

FIG. 4b
START/
FOOD SELECT

FIG. 5a

FIG. 5b
FOOD SCOOP

FIG. 6a

FIG. 5b
PARTIAL BOWL ROTATE/
FOOD SCRAPE

FIG. 7a

FIG. 7b
SPOON BOTTOM
SCRAPE

FIG. 8a

FIG. 8b
FOOD
PRESENTATION

FIG. 9a

FIG. 9b
RETRACT

FIG. 10b
FOOD DUMP

FIG. 11b
SPOON SHAKE

FIG. 12b
RETURN TO START

FIG. 19

ASSISTIVE DINING DEVICE, SYSTEM AND METHOD

TECHNICAL FIELD OF THE INVENTION

The present invention relates to an assistive dining device, system and method, and in particular, to an automatic device and system for selecting a variety of food, spooning the food from a receptacle, and presenting the food for hands-free oral consumption.

BACKGROUND OF THE INVENTION

There has long been a need for self-feeding apparatuses for use by individuals having physical limitations or disabilities, but who are otherwise perfectly capable of selecting and orally consuming desired foods. Without such devices, individuals must rely on nurses, guardians or other caretaker assistants through the entire course of a meal.

The self-feeding devices previously known have not been entirely satisfactory. Some devices require the user to be fitted with a headband and a scraping utensil to push food into a spoon, a chute, or a mouthpiece with head and neck motions activating the scraper attached to the headband. Such devices are shown in U.S. Pat. Nos. 3,734,306; 4,398,857; and 4,364,699. These devices have various drawbacks, especially where the control of head and neck motion of the user may be restricted or otherwise not capable of the type of fine motor coordination required to scrape food from a larger receptacle to a smaller dispensing utensil. Similar drawbacks are associated with feeding devices as disclosed in U.S. Pat. Nos. 3,885,681 and 4,218,167, which require the user to exert sufficient head and neck control to operate the spoon, fork or other eating appliance with the handle in the user's mouth, placing the utensil in a stationary position and releasing the handle or control mechanism to consume the food previously placed on the utensil.

One feeding device, as disclosed in U.S. Pat. No. 4,162,868 applies measured quantities of food from selectable receptacles by means of pressurizing the receptacles. Essentially, this device provides premeasured slugs of semifluid foodstuffs into a linearly reciprocating spoon for presentation to the user for consumption. Such a device is not well-suited for many normal types of food, such as chopped vegetables, meat and the like, which are not pureed to a liquid form. Further, the pressurized receptacles can obscure the view of the food from the user, making personal selection of the type of food difficult and unappetizing.

Another self-service apparatus for serving food and drinks is disclosed in U.S. Pat. No. 4,624,613, in which a horizontal carousel rotating about a vertical axis is rotatable in predetermined steps about a horizontal axis so that solid foods can be pushed radially toward the user through an opening in the carousel on individual serving trays. This device requires independent loading of each serving tray with small portions of food or drink to be presented to the user.

Another self-serving feeding apparatus, as disclosed in U.S. Pat. No. 4,433,950, provides a spoon carried by a pivot arm which is permitted to fall by gravity about its pivot point to lower it across a plate, which plate turns incrementally toward the spoon, thereby filling the spoon. Subsequently, the spoon is lifted above the plate for consumption. The plate can be selectably positioned to scoop different varieties variously placed at differing locations on the plate, thereby allowing the user to select the food desired. This device has drawbacks in that controlling the dropping of the spoon onto the plate at the desired position is difficult, the foods become mixed together as the plate is turned and the presentation of the spoon upwardly over the plate in many instances does not allow the user adequate clearance to access the spoon for consumption.

Another device for feeding physically-impaired persons, as disclosed in U.S. Pat. No. 4,522,543, includes a spoon supported for orbital and rectilinear movement in a predetermined path with one or more receptacles being moveable into the path of movement of the moving spoon. This device requires a large mechanism to accomplish the appropriate orbital and rectilinear motion. It has a further drawback, that it does not permit the spoon to be emptied of its content between feeding cycles, such that if the food from one receptacle is initially selected and then rejected, the quantity remaining on the spoon cannot be removed by the user without eating it or mixing it with food in other receptacles.

Thus, the previously known self-feeding devices are generally cumbersome, bulky, awkward or otherwise at variance from the style of eating generally adopted by individuals without physical disabilities. Users of such devices are often embarrassed by the awkwardness and obvious differences in the style of eating which they must endure.

SUMMARY OF THE INVENTION

The present invention overcomes many of these and other drawbacks and disadvantages of prior devices with an assistive dining device and system for automatic or switch-operated self-feeding. The device includes a concave food receptacle having a predetermined depth and shape below an upward projecting receptacle lip. A rod which is both rotatable and linearly moveable along its axis is mounted substantially parallel to and positioned above the upwardly projecting lip of the food receptacle. A feeding utensil such as a spoon, is affixed to the end of the rod for rotation and linear movement therewith. In a first position, the spoon is angularly disposed from the axis of the rod such that the plane of the open face of the spoon is substantially horizontally downward upon rotation of about one-half of a revolution to a second position and the open spoon face becomes positioned substantially horizontally upward. The radius of an arc defined by the end of the spoon upon rotation corresponds to the predetermined depth of the food receptacle. A motor and rotary drive is selectively activated for rotating the rod and the spoon from the first to the second position, so that the spoon moves through the concave opening of the receptacle to pick up food therein. A motor and linear drive moves the rod and spoon linearly when it is in the second rotary position from a retracted linear position to an outward linear position, past the lip of the receptacle for presenting food in the spoon for consumption by the user and returns the spoon to the retracted linear position after the food is consumed, or after the food is rejected by the user. From the second rotary position to the first and subsequently, from the second rotary position to the first rotary position so that any unconsumed food in the spoon is redeposited into the receptacle. An easy access switch is provided for the user to activate the automatic feeding device through a cycle or a portion of the cycle.

A further feature of the invention includes a food tray having multiple concave food receptacles thereon which can be selectably rotated on a horizontal platter. The food tray is automatically positioned below the spoon in its first rotary and retracted linear position so that the spoon can be selectably activated for rotation through the selected receptacle and subsequent presentation of the desired food to the consumer.

A further feature of the invention provides a partial cover attachment to a portion of the upward projecting lip of a receptacle. The cover attachment is constructed to tap and/or scrape excess quantities of food from the spoon prior to presentation. The partial receptacle cover may be flat, to compress soft foods such as mashed potatoes, or may be concave upwardly to permit chunky foods to be heaped onto the spoon to a predetermined height. The spoonfuls may be further shaped or scraped by with an edge projecting downwardly from the cover using a coordinated partially reversed rotary motion of the concave receptacle on a rotary tray.

A further feature of the invention includes a concave depressed lip portion of the receptacle which is aligned for contacting the bottom of the spoon during linear presentation of the spoon to the user. A further feature of the invention is the use of a strain switch, associated with the attachment of the spoon to the rotary and linearly moving presentation rod. Contact with the spoon during linear presentation as when the user is consuming food from the spoon, deactivates any further motion of the mechanism until the function is completed or until the obstruction is dislodged or moved from contact with the spoon.

BRIEF DESCRIPTION OF THE DRAWINGS

These and other objects and advantages of the invention will be better understood with reference to the drawing, in which like numerals represent like elements and in which:

FIGS. 4a and 4b through 12a and 12b are schematic;

FIG. 6b is a schematic front view depicting partial food tray receptacle rotation and top food scraping or shaping;

DETAILED DESCRIPTION OF THE PREFERRED EMBODIMENTS

Figure 1:
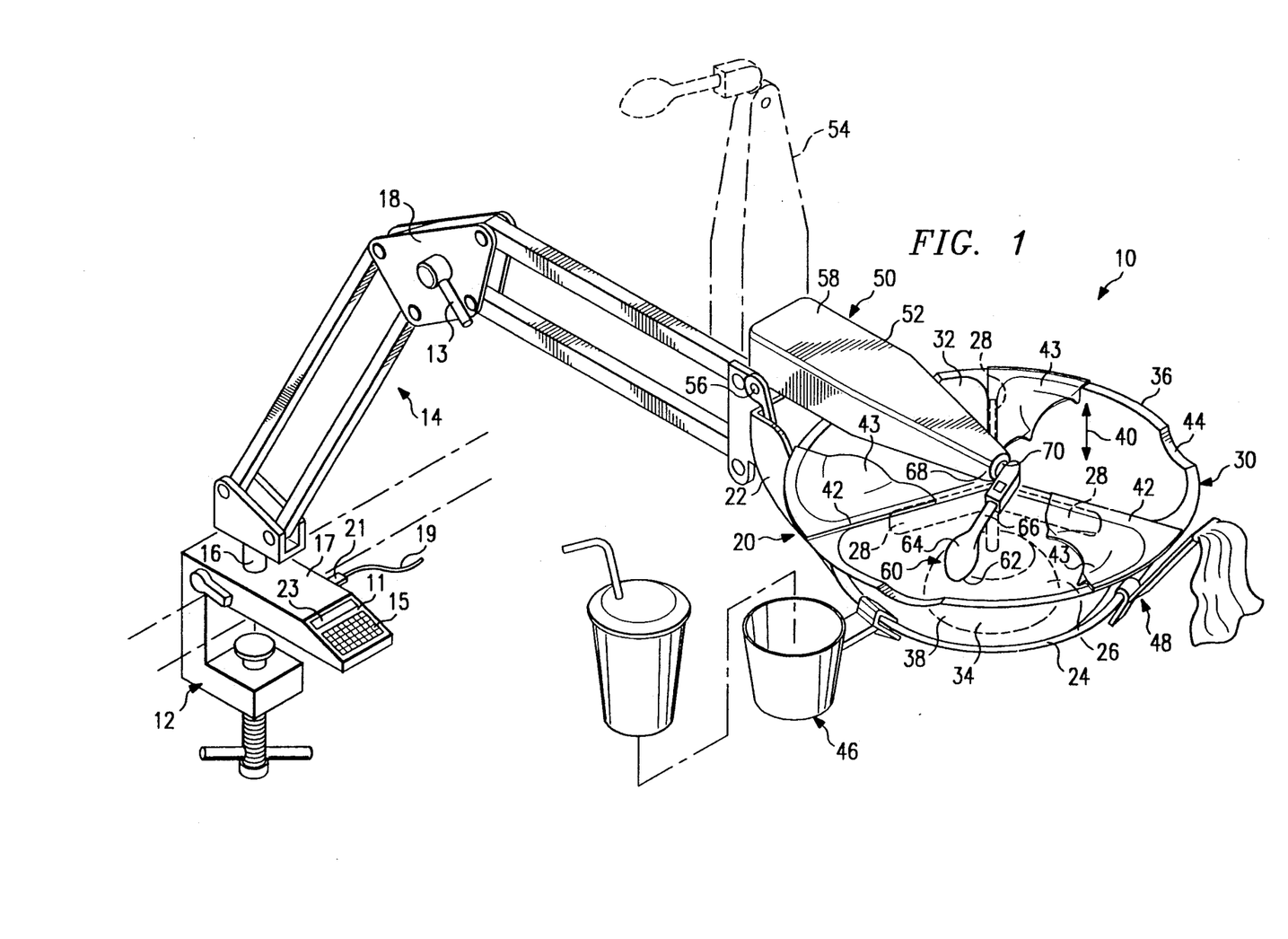
FIG. 1 is a perspective view of the assistive dining device, according to the present invention.

FIG. 1 depicts an assistive dining device in one preferred embodiment, according to the present invention, designated generally as numeral 10. The device preferably includes a clamp mount 12 of the type for removably clamping the device to tabletops, countertops and other normal food serving surfaces. Alternatively, clamps may be used where are suited for clamping to bedrails, wheel chair arms and other like rigid surfaces at which feeding may take place. A unique light weight adjustable arm 14, with a single friction lock 13 is adapted for maintaining heavy loads in continuous horizontal orientational, and extends from the clamp mount 12 to tray table 20. Preferably a multi-position versatile mounting arm 14 is used which does not use spring counterbalancing and which has rotation capabilities as at 16 and parallel positioning mechanism 18 for attachment to tray table 20 through a neck portion 22. The parallel positioning arm 18 preferably maintains the tray table 20 in a horizontal orientation regardless of the position to which the tray is moved, using adjustable arm 18. The tray table 20 preferably has an circular rim 24, which may be upturned at the periphery thereof and preferably includes a central pivot dome 26 for purposes of a tray-positioning mechanism 28, as well as for positioning a food receptacle tray 30.

In the preferred embodiment, the food receptacle tray 30 comprises a concave bowl 32, which has an upward rim or lip 38 and a concave depth of curvature 40. In the preferred embodiment, the receptacle 30 will comprise a first concave bowl 32, second concave bowl 34 and third concave bowl 36, arranged for circumferential rotation around circular tray table 24. Each concave bowl will preferably be constructed of clear or transparent plastic material to allow maximum visibility of the contents by the user, who may otherwise have an obstructed view due to limited head and neck mobility. Access to the content of the bowls is also facilitated by a substantially open top portion surrounded by lip 38. The multiple receptacles may be independently formed to be rotated by positioning means 28, which preferably includes a three-pronged spoke and receptacle tray carrying arrangement. Preferably, the receptacle tray 30 is integrally formed with the interconnecting bowls 32, 34 and 36 for a convenient food preparation and service. Advantageously, a concave lip portion 44 is formed on the exterior periphery of the bowl lips 38, which serves to scrape drips or other food off of the bottom of the spoon or utensil as it is being presented to the user for feeding, as will be explained more fully below.

Preferably, the device is also advantageously constructed for holding other accessories, such as drink accessory 46, napkin accessory 48 or sandwich holder (not shown). Holders for such other accessories are preferably formed to slip over the upturned edge portion of tray table 24.

A utensil moving unit, designated generally as 50, is horizontally positioned in a first position 52 above the tray table 24 with the receptacle tray positioned thereon. In the horizontal first position utensil moving unit 50 is sufficiently raised above the tray table to allow the receptacle tray 30 to rotate from one bowl to the next without interference from utensil moving unit 50. As shown in phantom lines at 54, the utensil moving unit can be pivoted in its entirety about arm pivot shaft 56 to a raised position to allow access, removal and replacement of the food serving receptacle 30. The utensil moving unit 50 will preferably have a smooth cover 58 to keep dust and spillage from interfering with the interior mechanism. The construction and operation of unit 50 will be explained more fully below with respect to FIGS. 2 and 3.

The food serving utensil 60, in the preferred embodiment is a spoon 60. A spoon utensil is advantageous because of its versatility in holding multiple varieties of foods with minimum possibility of spillage. The spoon or utensil 60 will have an open face 62 for carrying the food and an opposed spoon bottom 64. The spoon handle 66 is attached to a rotary and linear movement rod 70. Preferably, the utensil 60 is flexibly attached to minimize any hazard to the user. Preferably, a flexible spoon handle provides this flexibility. Further, an entirely flexible spoon is advantageous to avoid mouth injuries due to inadvertently hard biting, such as reflex biting. The rod 70 is rigidly supported for linear sliding and for rotation at a distal end support bearing 68.

Preferably, there is a control panel 11 which may for example be attached at clamp mount 12. The panel 11 has an input keyboard 15 and associated circuitry 17 operatively interconnected with the utensil moving unit 50 so that the selection sequence, the presentation times and the pause times can be programmed depending upon the particular needs of an individual user. The circuitry 17 may for example be hard wired in the panel 11 or may be a separate computer (not shown) connected at 19 through a standard cable connector 21 or port 21. A display 23 may also be beneficial for programming purposes.

Figure 2:
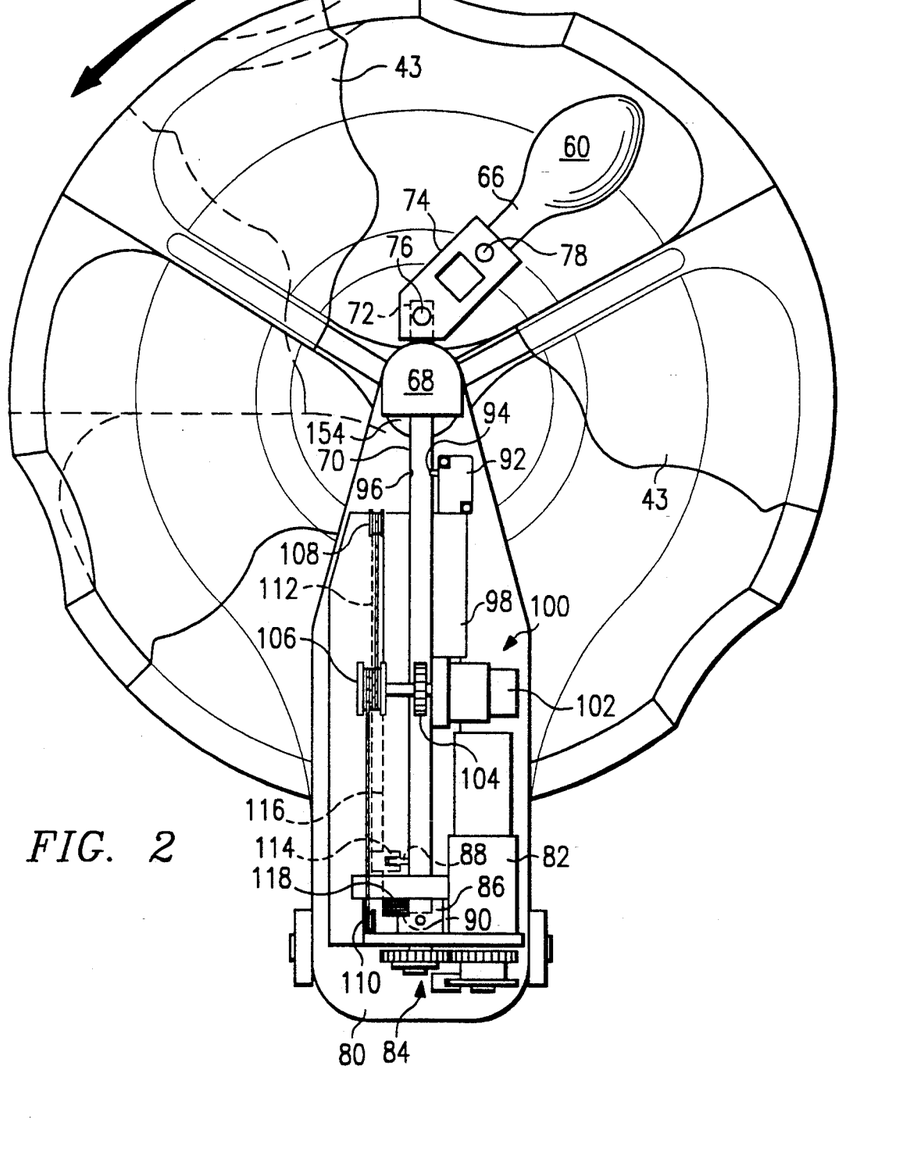
FIG. 2 is a top plan view of the rotary table receptacle, presentation arm and feeding utensil, according to the present invention.
Figure 3:
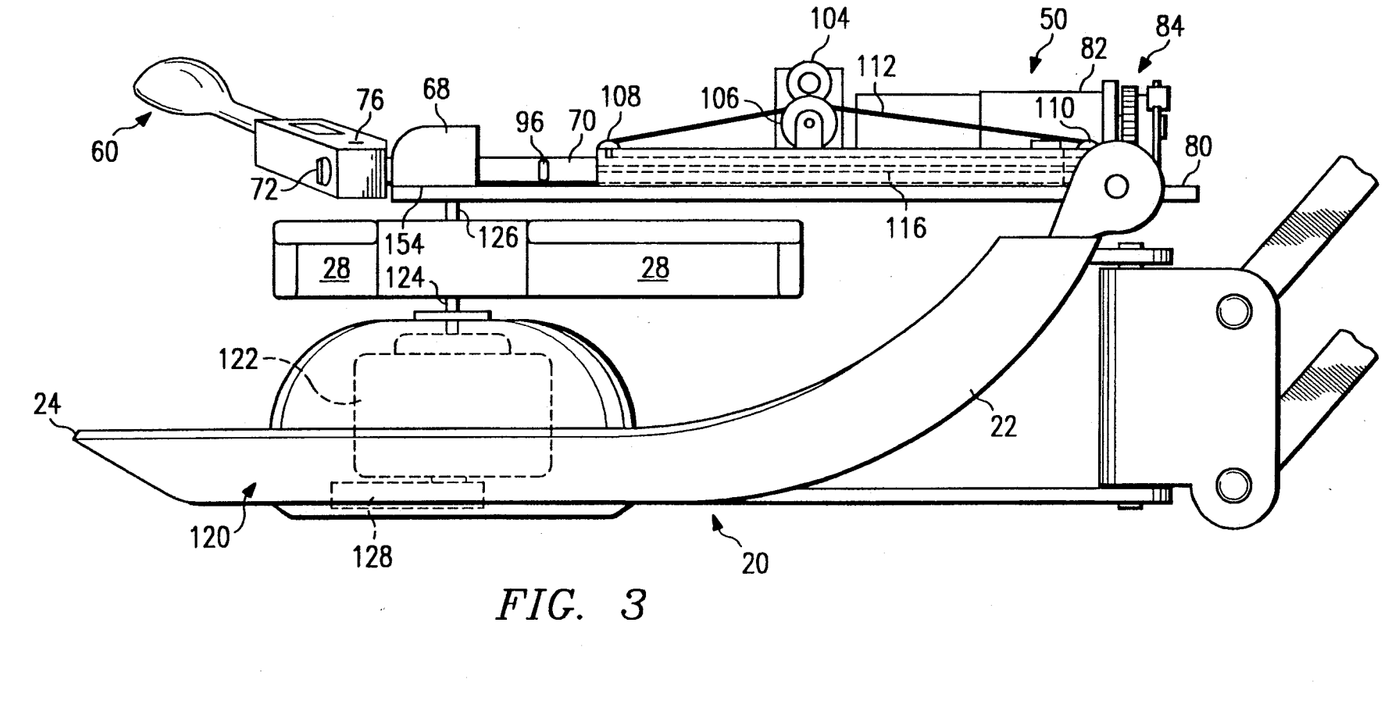
FIG. 3 is a side plan view of the assistive dining device according to the present invention.

Referring now to FIGS. 2 and 3, the details of construction of the internal mechanism of the assisted dining device 10 can be more fully understood. The rod 70 has a distal end 72 shown in hidden lines to which a flexible utensil coupler 74 is attached. Preferably utensil coupler 74 is made out of a flexibly resilient plastic, rubber or other polymer material. An attachment means 76 such as a set screw or other acceptably secure clamping means may be used for this purpose. The coupler 74 is provided at an opposed end with utensil locking means 78, which is preferably a thumb screw or a threaded wing fastener or other manually operable clamping mechanism, which allows the handle 66 of the utensil 60 to be easily removable and replaceable for cleaning, disposal or other like sanitation preparations.

The linear and rotary rod 70 is rotated by a rotary motion means 82 attached to base 80. Preferably rotary motion means 82 is an electric rotary motor 82, having appropriate safety approved electric controls and power supply. The device may be entirely automatic such that it is set in motion by the guardian to begin food presentation. The user has control by accepting or rejecting the presented food as determined by pressure sensation at the sensor 150. Advantageously, an easily accessible single button control switch to allow greater control by the user will be used in connection with automatic electrical control circuitry, such as a programmable computer, as will be explained in greater detail below. More than one switch may also be used to increase the user's control in cases where the user has sufficient motor skills. The rotary motor 82 rotates a gear train 84, which in turn rotates a rotary drive collar 86, which collar 86 is held, axially aligned with rod 70. A rod drive pin 88 projects radially from rod 70 at the proximal end thereof and is sized for engagement into a slot 90 formed radially through a portion of rotary drive collar 86. The controls of rotary motor 82 preferably will be inactivated, unless the rod 70 is in its fully retracted position. The construction of the slot 90 in collar 86 avoids turning the rod unless it is fully engaged in the retraced position. In a preferred embodiment a position switch 92, such as is a microswitch 92, detects the presence of a shallow detent 94 in the surface of rod 70. A second position detent 96 may also be advantageously formed in rod 70 on the opposite side from the detent 94. Rod 70 is supported by an elongated rod support bearing 98, which elongated rod support bearing 98 acts in cooperation with distal end support bearing 68 to support the rod in both rotation and linear actuation.

The elongated rod support bearing may, for example, be a grove or a channel made of nylon or other reduced friction plastic or made of an otherwise substantially rigid material which has a reduced friction surface, such as Teflon coated surfaces or the like. The elongated support bearing provides both rotational bearing support and linear translation support with minimized friction.

A linear drive mechanism 100 is also provided. The linear drive mechanism preferably includes a motor 102, which is preferably an electrical motor with appropriate safe voltage power supply and electronic controls for starting and stopping the motor. The motor can therefore be actuated to rotate a string drive pulley 106 through a slip gear 104. The slip gear 104 is provided so that obstruction of the spoon, either by objects or from inadvertent contact with the user will allow the linear translation to be safely interrupted through slipping at slip gear 104. Linear motion is resumed when the obstruction is removed. Preferably actuation of motor 102 will be controlled with position sensors such that the motor continues to rotate until either the position is sensed or an excessive time has elapsed. Thus, complete linear translation can be completed when the obstruction is promptly removed without reactuating the motor. The drive pulley has wound thereon a portion of a drive string 112, which extends around distal end pulley 108 and proximal end pulley 110 fastened at one point on the drive string below and in-between the distal end pulley 108 and the proximal end pulley 110 is a pin drive string connector 114, which translates back and forth along drive pin slot 116 and engages rod drive pin 88, thereby causing linear translation of rod 70 upon actuation of motor 104. At the proximal end of the drive pin slot 116 is a rotary escape slot 118, which allows drive pin 88 to be engaged by the collar 86 and rotary slot 90 to thereby rotate rod 70 only when it is in its fully retracted position, such that drive pin 88 is in a corresponding location with rotary escape slot 118.

In the preferred embodiment, there is a food receptacle tray positioning means 120, which includes a motor 122, which drives a shaft 124, to which receptacle rotator spokes 128 are connected. Again, in the preferred embodiment, motor 122 is an electrical motor activated by appropriate safe power supply low voltage, and control circuitry as by flexible insulated wires connected to the electronic control circuit, as will be described more fully below. For additional rigidity, shaft 124 advantageously extends vertically upwardly at shaft end 126 for rotational bearing support engagement within a journal portion 125 formed in support end 68. Thus, when the arm 50 is in its downward horizontal position, the upper end 126 of shaft 124 is inserted into a hollow journal bearing support surface 125 formed in support end bearing 68 to thereby hold the tray 24 and the arm 50 in appropriate relative spatial positions. Thus spatially located coordinated action of the spoon 60 and food tray receptacle 30 is achieved. Preferably a position sensor 128 senses the position of spokes 28 as affected by the rotation of motor 122 and the position information is communicated to the control circuitry for appropriate rotary positioning of food receptacle 32.

The controlled motions of the receptacle tray and the controlled and coordinated motions of the spoon with respect to the receptacle tray will be more fully understood with reference to FIGS. 4a and 4b through FIGS. 12a and 12b, which schematically depict the various steps of operation of the assistive dining device.

Figure 4A:
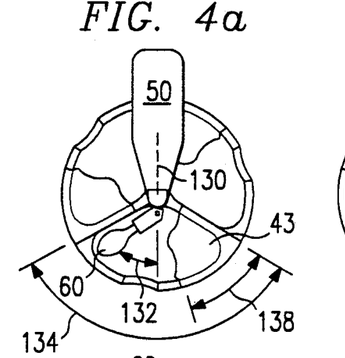
FIG. 4a is a schematic top view diagram of the various components depicting movement and positioning of the assistive dining device at the start and food selection step of the operation.
Figure 4B:
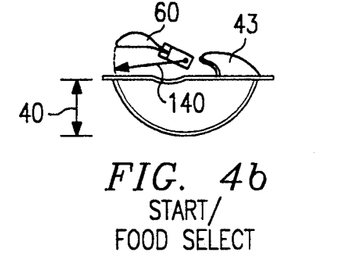
FIG. 4b is a schematic front view diagram of the various components depicting movement and positioning of the assistive dining device at the start and food selection step of the operation.

The start position is schematically depicted in FIGS. 4a and 4b, in which the axis of both rotation and lineation of rod 70 is depicted as axis 130. The angle 132 of the utensil 60, with respect to the axis 130 is depicted in FIG. 4a for a food tray 30 with three equally sized receptacle bowls and will be described in connection with one bowl 32. In the preferred embodiment, the angular disposition 132 of the utensil 60 is approximately one-half of the angular expanse 134 of the opening of receptacle bowl 32. With reference to FIG. 4b, it will be noted that the spoon face 62 in the first start position defines a substantially horizontal surface and is facing downwardly toward the interior of the food receptacle 32. The radius 140 of the tip of the spoon from the axis 130 is substantially equal to the depth 40 of the concave receptacle 32, such that rotation of the spoon about one-half of a revelation or about 180° through the receptacle moves the outermost tip of the spoon 60 in close proximity to the interior surface of the receptacle 32.

Figure 5A:
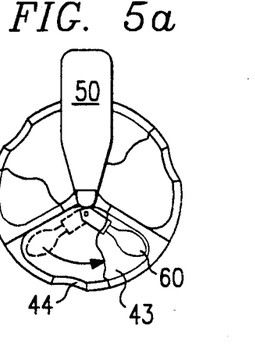
FIG. 5a is a schematic top view of the food scoop step.
Figure 5B:
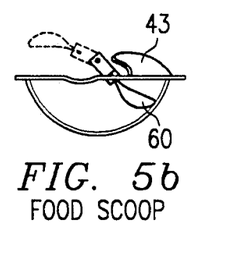
FIG. 5b is a schematic front view of the food scoop step.

With reference to FIGS. 5a and 5b, a second position of the spoon is schematically depicted, in which the spoon 60 is still in a linearly retracted position but has been rotated approximately 180°, so that the face 62 of the spoon is substantially horizontal facing upwardly, such that any food scraped from the receptacle onto the spoon during the 180° rotation will be maintained within the spoon. In this second rotary position, the spoon is preferably positioned underneath and in close proximity to one of the accessory partial covers to thereby compact or shape the quantity of food within the spoon. In this manner overfilling and subsequent spilling during food presentation is reduced.

Figure 6A:
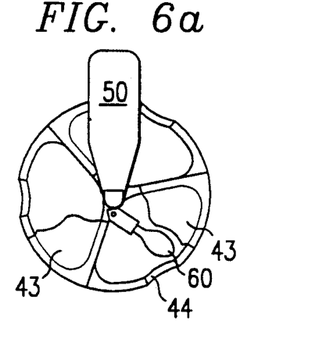
FIG. 6a is a schematic top view depicting partial food tray receptacle rotation and top food scraping or shaping.

FIGS. 6a and 6b, schematically depict a partial counter rotation of the bowl 32 to allow the food on the spoon to be further shaped by the edge of the food shaping cover accessory prior to linear actuation of the spoon for presentation of the food to the user.

Figure 7A:
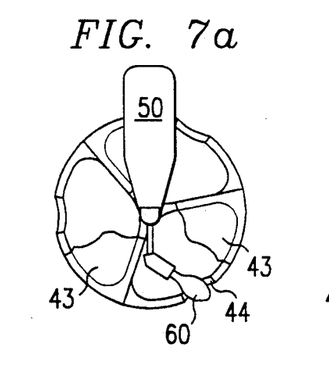
FIG. 7a is a schematic top view depicting intermediate linear movement position in which the bottom of the spoon is scraped at the lip of the receptacle.
Figure 7B:
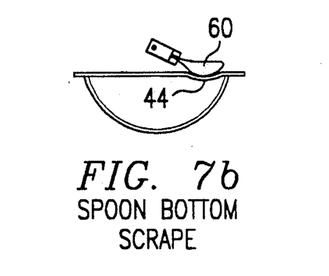
FIG. 7b is a schematic front view depicting an intermediate linear movement position in which the bottom of the spoon is scraped at the lip of the receptacle.

FIGS. 7a and 7b depict partial linear actuation of the spoon for presentation at a point where the spoon is passing over the outer periphery lip 38 of receptacle 32. This linear motion does not normally step at the position depicted, but is shown here for purposes of explanation. In this position, the concave lip portion 44 is aligned with the bottom of the spoon 64 such that any food or drippings which may be hanging from the bottom of the spoon will be scraped at the lip and will not result excessive spillage as linear actuation continues for fully extended food presentation.

Figure 8A:
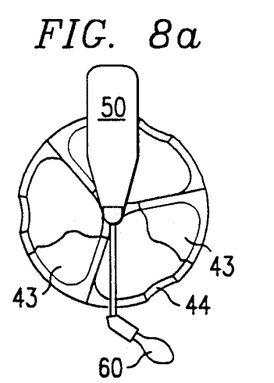
FIG. 8a is a schematic top front view depicting the linear food presentation position.
Figure 8B:
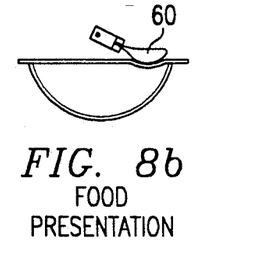
FIG. 8b is a schematic top view depicting the linear food presentation position.

Referring now to FIGS. 8a and 8b, the food presentation position is depicted. Throughout the linear actuation, the spoon is prevented from any further rotation by the pin 88 engaged in lineation guide slot 116. The spoon stops when full extension is sensed and remains extended for a time delayed period. If pressure from feeding contact with the spoon is sensed, the spoon will remain in the extend food presentation position until the feeding is completed.

Figure 9A:
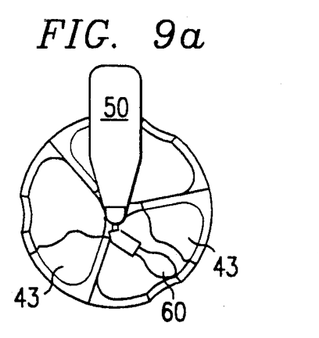
FIG. 9a is a schematic top view depicting the spoon retraction position.
Figure 9B:
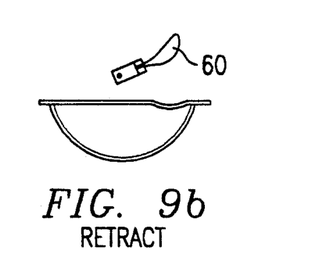
FIG. 9b is a schematic front view depicting the spoon retraction position.

FIGS. 9a and 9b show the spoon moved to its linearly retracted position.

Figure 10A:
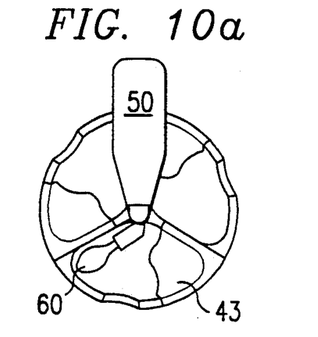
FIG. 10a is a schematic top view depicting the food dump step.
Figure 10B:
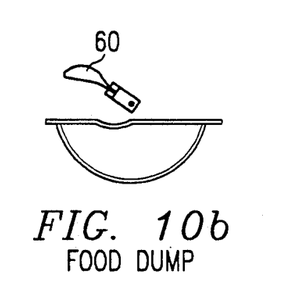
FIG. 10b is a schematic front view depicting the food dump step.

FIGS. 10a and 10b show the spoon rotated approximately 180° to return it to the start position.

Figure 11A:
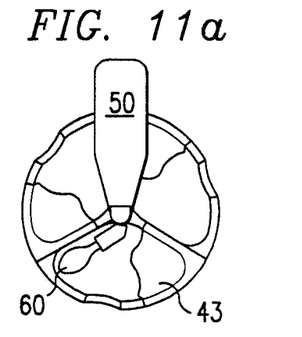
FIG. 11a is a schematic top view depicting the spoon shaking and food dislodging step.
Figure 11B:
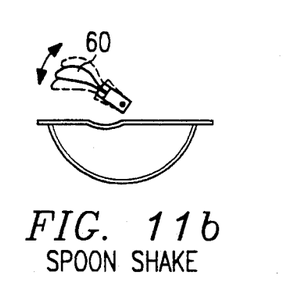
FIG. 11b is a schematic front view depicting the spoon shaking and food dislodging step.

In preferred embodiments, as shown in FIGS. 11a and 11b, the rotary motor controls are programmed to shake the spoon back and forth slightly as the spoon reaches its return position.

Figure 12A:
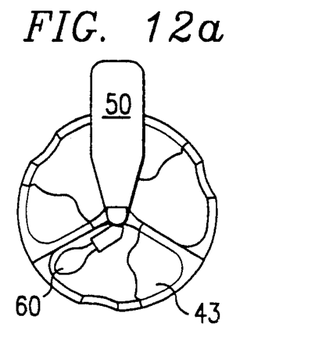
FIG. 12a is a schematic top view depicting the return to start position.
Figure 12B:
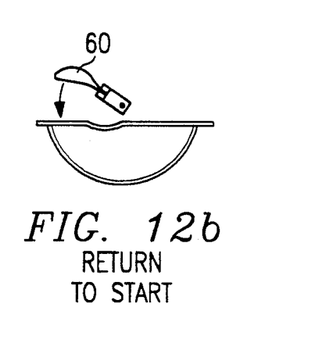
FIG. 12b is a schematic front view of depicting the return to start position.

FIGS. 12a and 12b show the spoon again returned to the start or first rotary position after shaking the food is completed.

The device is advantageously constructed so that the support bearing 68 is fastened through a strain sensor 150, which may be a piezoelectric substrate. The strain sensor is preferably sensitive to forces in any direction. In a piezoelectric device, strain on the substrate causes changes in the electrical characteristics of the piezoelectric material, which changed electrical characteristics are detected to thereby indicate that there is pressure on the utensil. In this manner, and with this unique mechanism, contact with the spoon by the user can be sensed or contact of the spoon with any other rigid surface can be adequately sensed so that the mechanism is deactivated, thereby preventing the spoon from being withdrawn from the user as feeding is taking place, only to be activated at a timed period after the strain switch no longer registers the contact.

Figure 13:
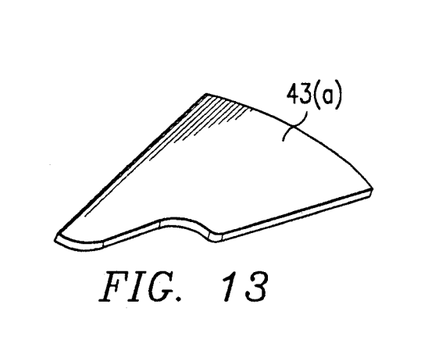
FIG. 13 is a perspective view of a flat food shaping accessory.
Figure 14:
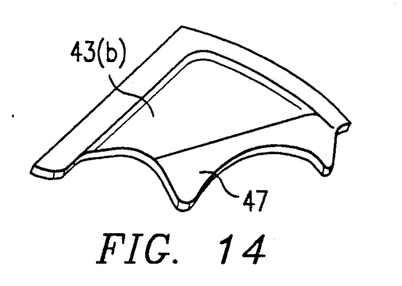
FIG. 14 is a perspective view of a heaping food shaping with a curved food shaping lip, according to the present invention.
Figure 15:
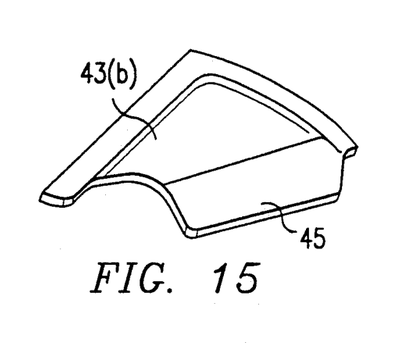
FIG. 15 is a food shaping accessory having a flat scraping lip.

Referring to FIGS. 13, 14 and 15, various embodiments of a food shaping partial cover plate are depicted. FIG. 13 depicts a flat accessory plate which is useful for compacting compressible foods, such as mashed potatoes, gravies, soups or the like.

FIG. 14 has a concave, upwardly shaped food shaping accessory for shaping the spoon to a substantially heaping spoonful for chopped vegetables, peas, chunky stews, meats and the like. However, the accessory depicted in FIG. 14 shows a downwardly projecting lip portion 160 having a concave shape, which is principally designed for shaping vegetables and chunky foods.

FIG. 15 depicts a downward lip portion 154 which may be used either on the flat accessory as shown in FIG. 13 or the heaping accessory as shown in FIG. 14 to scrape excess food materials from the spoon prior to linear food dispensing actuation.

Figure 16:
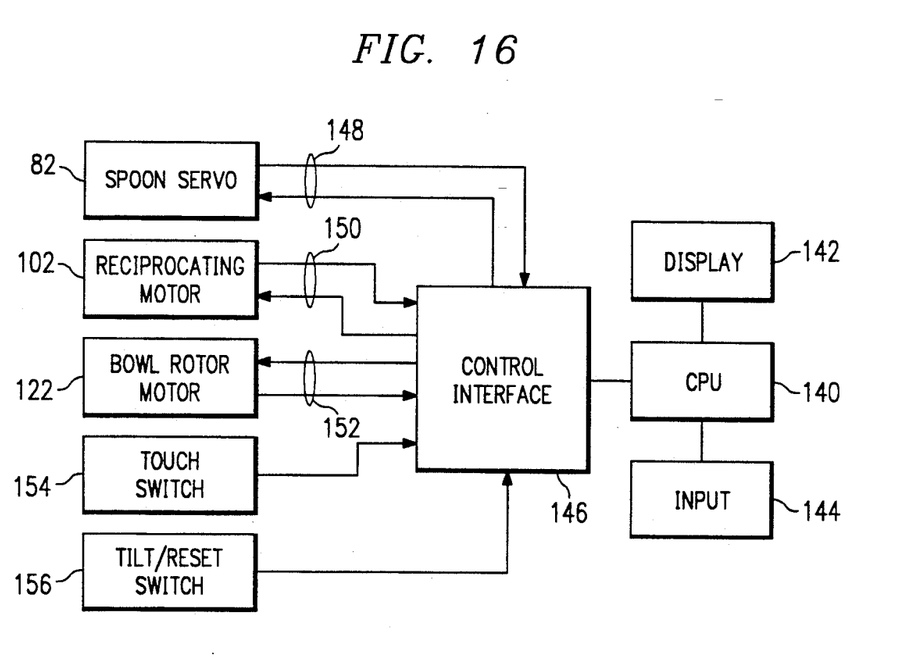
FIG. 16 is a schematic block diagram of the control central processing unit for the assistive dining device, system and method according to the present invention.

The control circuitry and operation of the apparatus as described above can be more fully understood with reference to FIG. 16, which is a schematic block diagram of the control circuitry.

Referring now to FIG. 16, there is illustrated a schematic diagram of the control central processing unit that is utilized to activate the mechanism of the present invention. A central processing unit (CPU) 140 is provided that has a display 142 associated therewith and an input device 144 associated therewith. The input device 144 can be a keyboard or the such. In the prototype of the present invention, a personal computer was utilized. The CPU 140 interfaces with a control interface circuit 146 which is a series of servo drivers that allow the signals output by the CPU to interface with the various motors that are utilized. The control interface circuit 146 utilizes various power transistors, drivers, etc.

The control interface 146 is interfaced with the spoon servo motor 82 through two lines 148. The two lines 148 represent one line going from the interface 146 to the spoon servo motor 82 to output control signals and the other line is routed from the spoon servo motor 82 to the interface 146 to provide servo control signals thereto. The interface 146 is interfaced with the linear drive motor 102 through two lines 150. The two lines 150 provide one control line from the interface 146 to the motor 102 and a sense line back from the motor 102. The sense line generally is connected to the switch 92 to indicate when the arm is fully extended. The bowl rotating motor 122 is connected with the interface 146 through two lines 152, one for providing control signals to the motor 122 and one for receiving servo feedback commands from the motor 122. A touch switch 154 is provided, which is mounted beneath the end-bearing support 60 and is operable to detect a slight variation in pressure. When this pressure is sensed, the reciprocating arm can be controlled in a number of different ways. In one way, pressure can result in the reciprocating arm not pulling the spoon away from the patient. In another mode, the touch switch can control the reciprocating arm so as not to push the spoon outward from the apparatus. The tilt/reset switch mounts below the rotary collar 86 and is operable to determine when the unit 50 is tilted upward. This is generally the reset operation.

Figure 17:
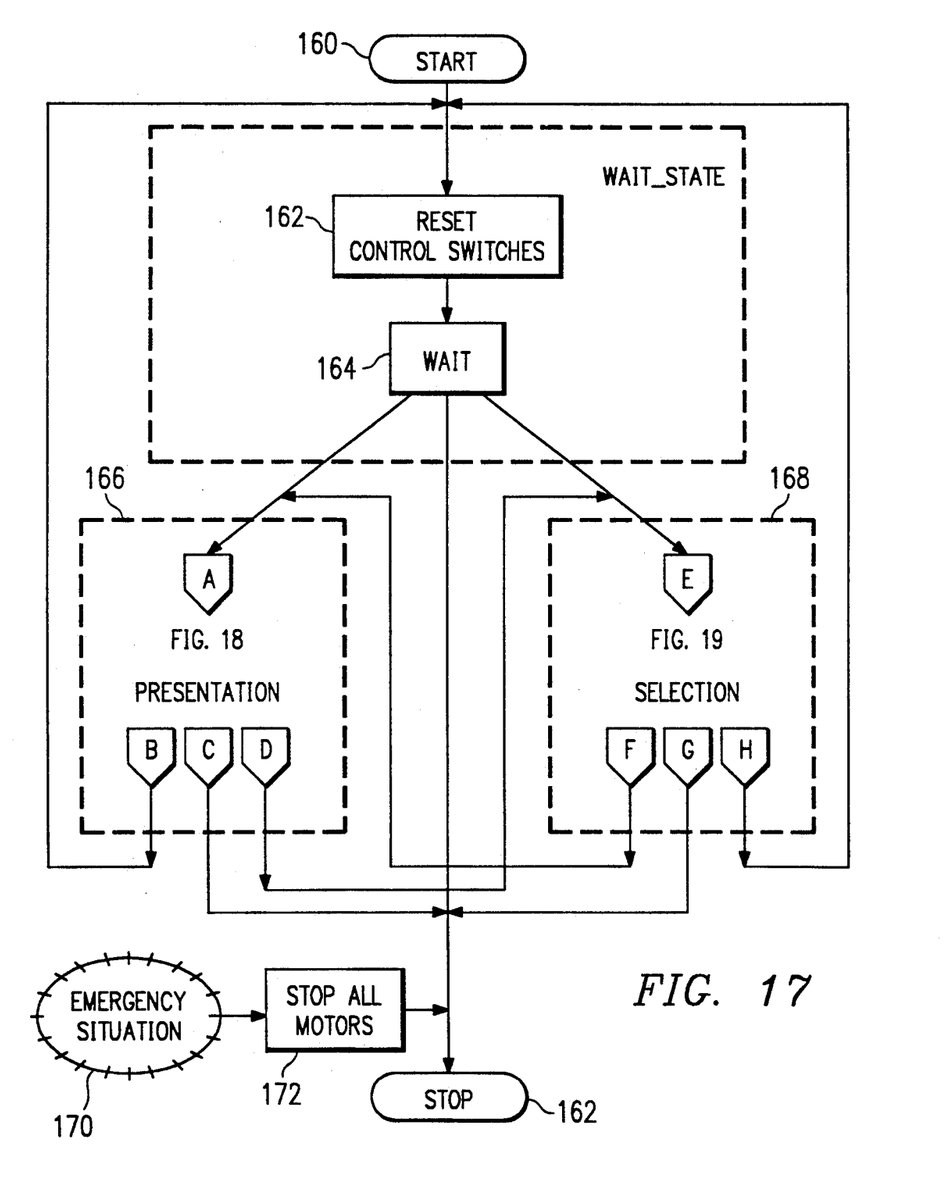
FIG. 17 is a schematic flowchart depicting presentation and selection operations.

Referring now to FIG. 17, there is illustrated a flowchart depicting the presentation and selection operations. The operation is initiated at a start block 160 and then proceeds to a block 162 to wait for a reset of the control switches at block 164. This operation will continue a wait operation until the presentation control switch is hit or the selection control switch is hit or a run interrupt is signaled. If the presentation control switch is hit, the program will flow to a block 166, representing the presentation operation. If the selection switch is hit, the program flows to a block 168 for the selection operation. If a run interrupt is signaled, the program flows to a stop block 162. After the presentation block 166, the program either returns back to the input of block 166, flows to the stop block 162 or flows to the input of the selection block 168. Similarly, after the selection operation of block 168 has been completed, the program either flows through the input of block 166, to the stop block 162 or back to the input of block 166. A separate operation indicated by a block 170 indicates an emergency situation which flows to a function block 172 to stop all motors and then to the stop block 162, which operation is initiated by a panic switch.

Figure 18A:
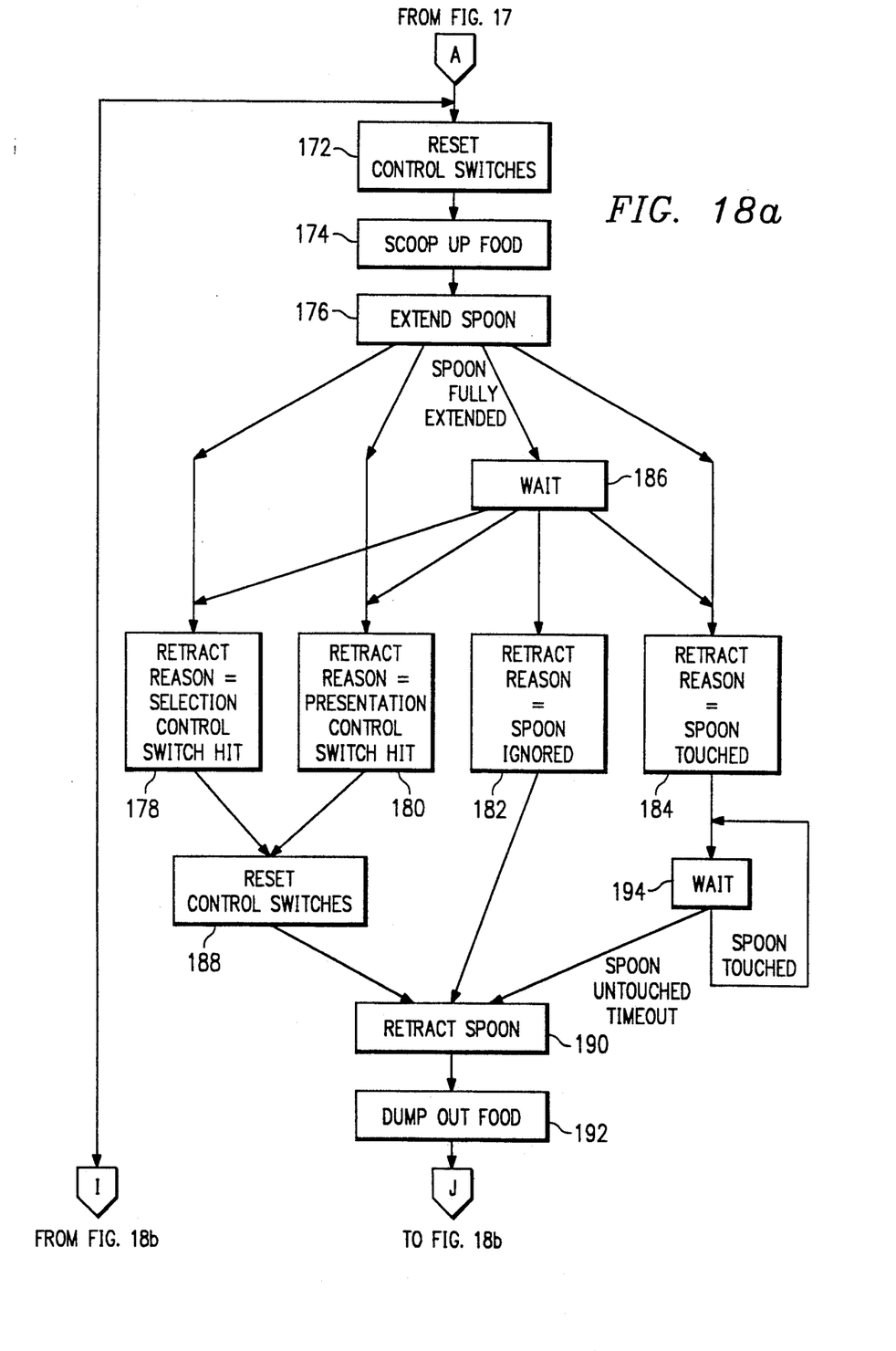
FIG. 18a is a schematic flowchart of the presentation operation illustrated a block 172 of FIG. 17.

Referring now to FIG. 18a, there is illustrated a flow chart for the presentation operation which is initiated at a block 172 to reset the control switch and then flows to a function block 174 to scoop up the food. After the food is scooped up, the program flows to a function block 176 to extend the spoon with the reciprocating arm. After the spoon is extended, the program flows to one of four blocks, 178, 180, 182 or 184. Block 178 provides retraction upon activation of the selection control switch. Block 180 provides retraction upon activation of the presentation control switch. Block 182 provides retraction upon the basis that the spoon was ignored, i.e., the patient did not take the food. Block 184 provides retraction upon the spoon being touched, to such an extent that it would activate the touch switch 154. Block 182 is only reached after a wait state which indicates that the spoon was fully extended, this being indicated by a function block 186. The function block 186 provides a condition wherein the spoon would be fully extended and then the program would flow therefrom to blocks 178, 180, 182 or 184. However, the program can flow directly from block 176 to blocks 178, 180 or 184.

Blocks 178 and 180 flow to a function block 188 to reset the control switches and then to the function block 190 to retract the spoon and then to a function block 192 to perform the dump operation. Function block 192 flows directly to the function block 190 to retract the spoon and function block 184 flows through a wait block 194 to the function block 190. Wait block 194 performs a wait operation that waits for the spoon to be touched prior to activation thereof. After a time out, the program will flow to function block 190.

Figure 18B:
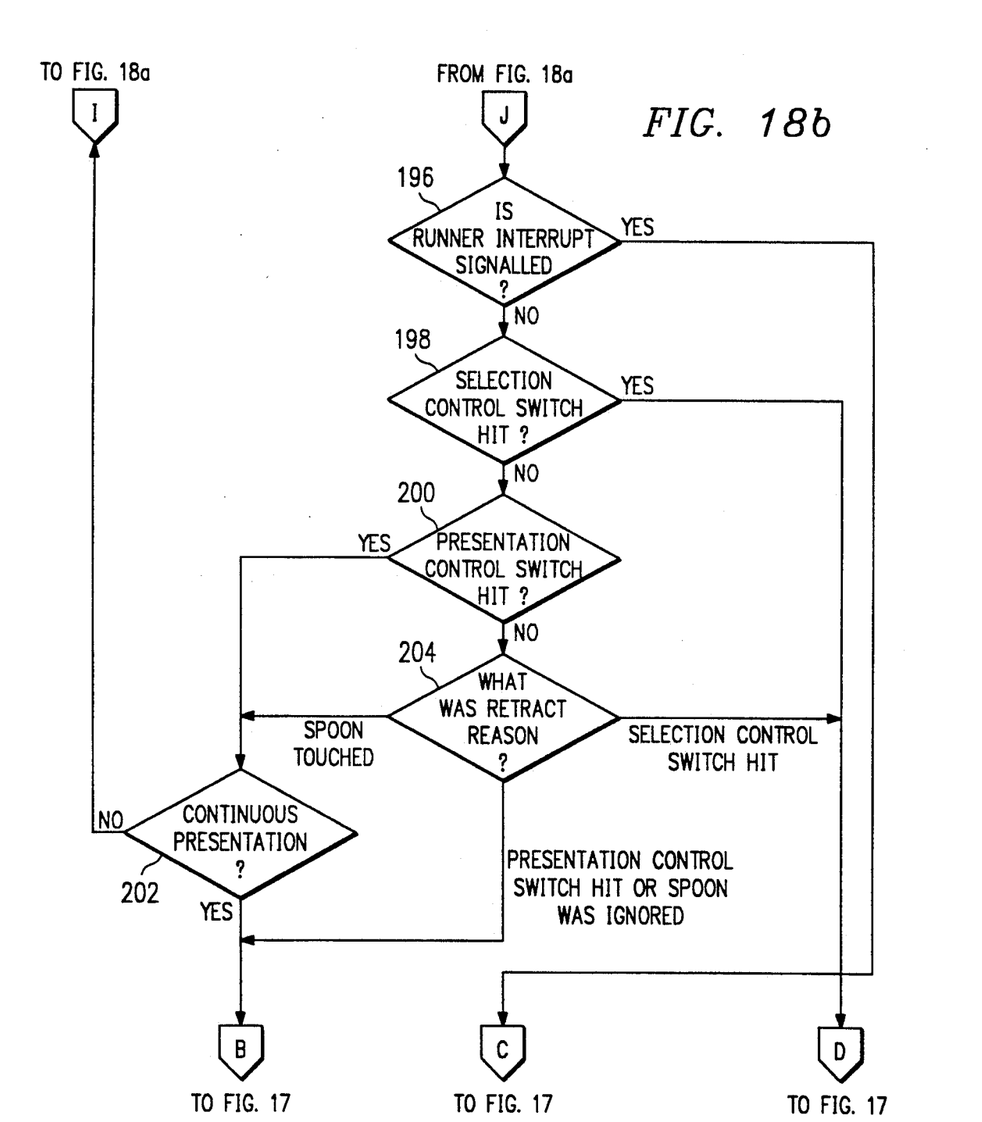
FIG. 18b is a schematic flowchart of an additional part of the presentation routine.

Referring now to FIG. 18b, there is illustrated an additional part of the presentation routine. The program flows from the function block 192 to a decision block 196 to determine if the run interrupt signal has been generated. If so, the program flows to the stop block 162. If not, the program flows to a decision block 198 to determine if the selection control switch is hit. If so, the program flows to the input of block 168 and, if not, the program flows to the input of a decision block 200 to determine if the presentation control switch is hit. If it is hit, the program flows to a decision block 202 to determine if continuous presentation has been programmed in. This is a flag. If this flag is set, the program flows back to the input of block 162 and if not, the program flows back to the input of function block 172. If the presentation control switch is not hit, the program flows from decision block 200 to decision block 204 to determine what the retraction reason was. If it was due to the spoon being touched, the program would flow to the input of the decision block 202 to determine if the continuous presentation flag was touched if the selection control switch were hit, the program flows to the input of function block 168, and if the presentation control switch were hit or the spoon was ignored, the program flows back to the input of function block 162.

Figure 19:
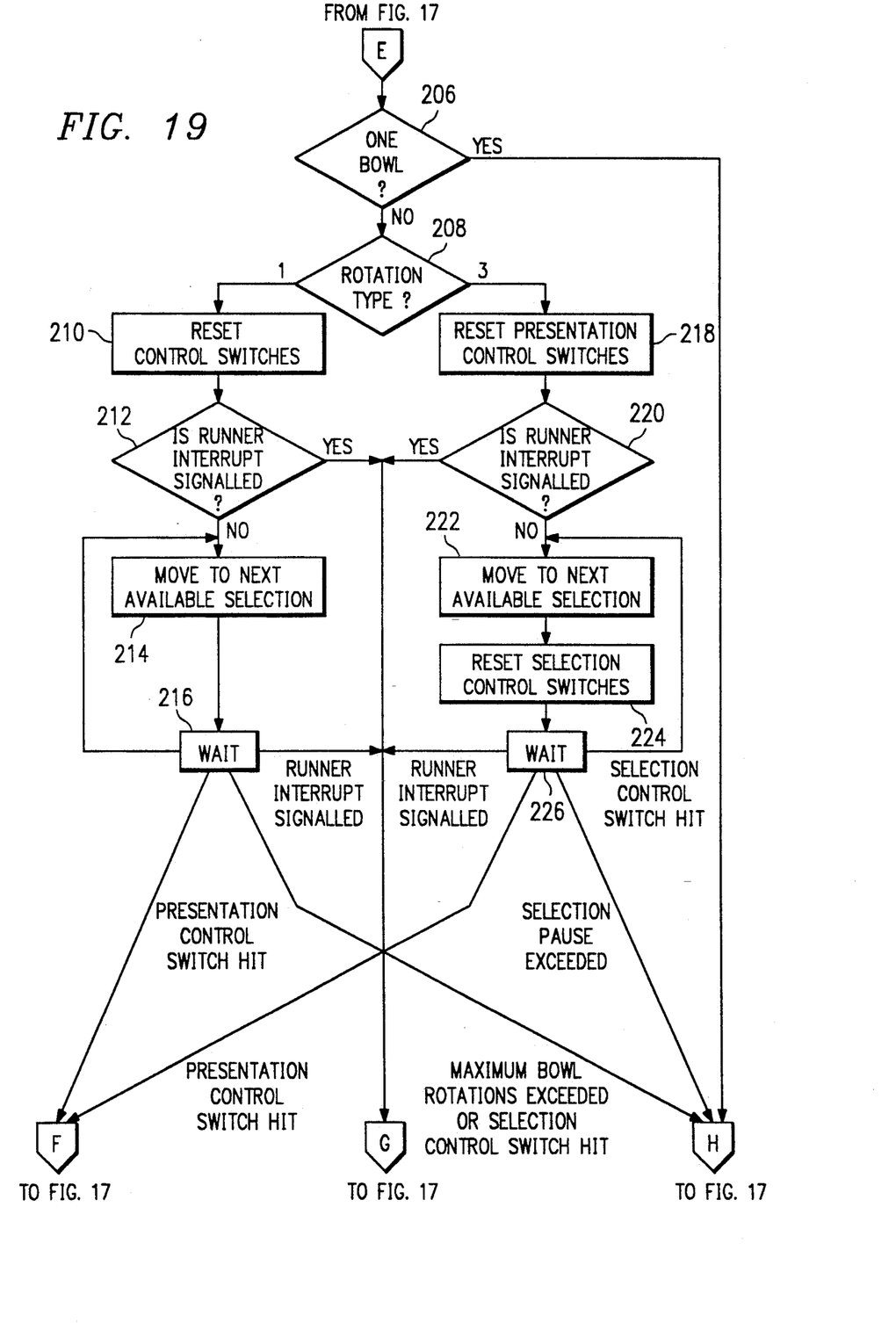
FIG. 19 is a schematic flowchart depicting the operation for the selection of a particular bowl segment.

Referring now to FIG. 19, there is illustrated a flowchart depicting the operation for the selection of the particular bowl segment. The program is initiated at a decision block 206 to determine if one bowl is selected. If so, the program flows back to the input of the reset control block switch 162. If not, the program flows to the input of a function block 208 to determine the type of rotation. It can either be a "1" type or a "3" type. If it is a "1" type, the program flows to a function block 210 to reset the control switches and then to a decision block 212 to determine if the run interrupt signal has been generated. If so, the program flows to the stop block 162 and terminate, and, if not, the program flows from the function block 214 to move to the next available selection. The program would then flow to a wait block 216 which would loop back to the input of function block 214 until a selection pause was exceeded. Once the selection pause has been exceeded, the program would determine whether a run interrupt signal has been generated and flow to the stop block 162, or back to the input of the reset control switch block 162 if the number of maximum bowl rotations had been exceeded, or the selection control switch was hit, or it would flow back to the input of function block 166 if the presentation control switch were hit.

If the rotation type were "3", the program would flow from decision block 208 to the input of a function block 218 to reset the presentation control switches and then to a decision block 220 to determine if the run interrupt signal was generated. If so, the program flows to the stop block 162, and if not, the program flows to a function block 222 to move to the next available selection. After moving to the next available selection, the program flows to a function block 224 to reset the selection control switches and then to a wait block 226. The wait block 226 operates similar to the wait block 216 in that it will flow to the terminate block 162 if the run interrupt signal is generated, to the input to the presentation block 166 if the presentation control switch is hit, or to the input of the reset control switch block 162 if the selection pause has been exceeded.

The above descriptions, with respect to FIGS. 18 and 19, are utilized with a two switch mode wherein various type of rotations are provided. In the mode described in FIG. 19, a type "1" arrangement and a type "3" rotation are provided for. The selection state could be altered to allow only one rotation state. Further, a mode can be provided that utilizes only one switch, rather than both the presentation and the selection switch, utilizing only a presentation control switch. In another mode, the system operates automatically without requiring the presentation or selection switch.

In addition to the above, the CPU provides the ability to program the speed of motion and the time durations of various wait states. Therefore, the speed with which the spoon rotates through the food can be varied, depending on the type of food. Further, the speed with which the spoon is first presented to the patient can also be varied. It is an important feature that the time durations for each of the operations can be varied, as each individual consumes food at a different rate. For example, a severely disabled individual would require the spoon to be presented for a much longer duration of time. Otherwise, the food may be retracted prior to the individual having taken the food from the spoon.

While the invention has been disclosed in connection with preferred embodiments, it is not intended to be limited to the specific embodiments disclosed, but to the contrary, is intended to include such alternatives and equivalents as may be embraced within the scope of the claims which follow.

What is claimed is:

1. An assistive dining device for automatic switch-operated self-feeding comprising:
   (a) a concave food receptacle having a predetermined depth below an upwardly projecting lip;
   (b) a rod having an end rotatable about an axis and linearly movable along the axis, substantially parallel to and above the upward projecting food receptacle lip;
   (c) a feeding utensil having food collection face and affixed to the end of the rod for rotation and linear movement therewith, which utensil is angularly disposed from the axis of the rod such that food collection face is substantially horizontal downward in a first rotary position and substantially horizontal upward in a second rotary position rotated approximately one-half of a revolution about the axis of the rod, so that the radius of the arc defined by the distal end of the utensil during rotation corresponds to the predetermined depth of the receptacle;
   (d) a motor operatively associated with the rod and utensil for rotating the utensil from the first rotary position to the second to collect food from the receptacle onto the utensil and also for rotating the utensil from the second rotary position to the first position;
   (e) a motor operatively associated with the rod for linearly moving the rod and utensil when in its second rotary position from a retracted linear position to an outward position past the lip of the receptacle for presenting the food on the utensil for consumption by the user and for returning the utensil to the retracted position; and
   (f) a food shaping partial cover plate attached to the lip of the concave food receptacle spaced above the utensil when rotated to its second rotation position so that food collected in the utensil is shaped by the partial cover plate prior to presentation to the user for consumption.

2. An assistive dining device for automatic switch-operated self feeding comprising:
   (a) a concave food receptacle having a predetermined depth below an upwardly projecting lip;
   (b) a rod having an end rotatable about an axis and linearly movable along the axis, substantially parallel to and above the upward projecting food receptacle lip; p1 (c) a feeding utensil having food collection face and affixed to the end of the rod for rotation and linear movement therewith, which utensil is angularly disposed from the axis of the rod such that food collection face is substantially horizontal downward in a first rotary position and substantially horizontal upward in a second rotary position rotated approximately one-half of a revolution about the axis of the rod, so that the radius of the arc defined by the distal end of the utensil during rotation corresponds to the predetermined depth of the receptacle;

(d) a motor operatively associated with the rod and utensil for rotating the utensil from the first rotary position to the second to collect food from the receptacle onto the utensil and also for rotating the utensil from the second rotary position to the first position;

(e) a motor operatively associated with the rod for linearly moving the rod and utensil when in its second rotary position from a retracted linear position to an outward position past the lip of the receptacle for presenting the food on the utensil for consumption by the user and for returning the utensil to the retracted position; and (f) a concave portion formed in the upwardly projecting lip of the concave food receptacle and positioned in the path of the linearly presented utensil spaced slightly below the center line of lineation such that the concave lip portion contacts the bottom of the utensil thereby wiping drips or food accumulations as may be retained on the bottom of the utensil.

3. An assistive dining device of the type for automatically scooping a utensil through a container of food and presenting the utensil to the user for hand-free consumption of food from the utensil, the improvement comprising:

(a) a utensil actuating mechanism having a single axis about which the utensil is rotated through the container of food to collect food on the utensil;

(b) means for linearly moving the utensil along the same single axis about which utensil rotation occurs for presenting food to the user for consumption and for returning the utensil along the same linear axis for subsequent rotation through the food container; and (c) pressure sensor means operatively associated with the means for linearly presenting the utensil so that when pressure contact with the utensil is detected, linear motion is stopped, thereby allowing the user to consume food from the utensil without having the utensil linearly retracted while consumption contact is ongoing.

4. An assistive dining device of the type for automatically scooping a utensil through a container of food and presenting the utensil to the user for hand-free consumption of food from the utensil, the improvement comprising:

(a) a utensil actuating mechanism having a single axis about which the utensil is rotated through the container of food to collect food on the utensil;

(b) means for linearly moving the utensil along the same single axis about which utensil rotation occurs for presenting food to the user for consumption and for returning the utensil along the same linear axis for subsequent rotation through the food container; and (c) wherein the utensil actuating mechanism for rotating the utensil about a single axis further comprises an axially elongated rod supported for rotation about said axis and having a pin radially extending therefrom engagable with a radial slot in a rotatable end collar when the utensil is in its retracted position and motor means operatively associated for rotating the end collar thereby rotating the rod for rotation of the utensil attached thereto.

5. An assistive dining device of the type for automatically scooping a utensil through a container of food and presenting the utensil to the user for hand-free consumption of food from the utensil, the improvement comprising:

(a) a utensil actuating mechanism having a single axis about which the utensil is rotated through the container of food to collect food on the utensil;

(b) means for linearly moving the utensil along the same single axis about which utensil rotation occurs for presenting food to the user for consumption and for returning the utensil along the same linear axis for subsequent rotation through the food container; and (c) wherein the means for linearly moving the utensil further comprises an elongated rod having a pin radially extended therefrom, which pin is slidably engagable along a linear groove and actuatable through a drive string around a pulley wheel driven by a motor to lineate the rod backwards and forwards along the axis.

* * * * *